United States Patent [19]

Miller

[11] 4,330,212

[45] May 18, 1982

[54] TRIAXIS LASER ALIGNMENT SYSTEM AND METHOD

[75] Inventor: John M. Miller, Huntington Station, N.Y.

[73] Assignee: Grumman Aerospace Corporation, Bethpage, N.Y.

[21] Appl. No.: 200,003

[22] Filed: Oct. 23, 1980

Related U.S. Application Data

[63] Continuation of Ser. No. 970,651, Dec. 18, 1978, abandoned.

[51] Int. Cl.$^3$ .......................... G01B 9/02; G01B 11/27
[52] U.S. Cl. ..................................... 356/354; 356/138; 356/375; 356/395
[58] Field of Search ............... 356/138, 153, 354, 363, 356/375, 395

[56] References Cited

U.S. PATENT DOCUMENTS

| | | | |
|---|---|---|---|
| 3,107,168 | 10/1963 | Hogan et al. | 356/399 |
| 3,154,688 | 10/1964 | Shepherd | 250/237 G |
| 3,169,193 | 2/1965 | Strang | 250/237 R |
| 3,269,254 | 8/1966 | Cooper et al. | 356/138 |
| 3,614,238 | 10/1971 | Stites | 356/373 |
| 3,726,595 | 4/1973 | Matsumoto | 356/356 |
| 3,801,205 | 4/1974 | Eggenschwyler | 356/138 |
| 3,844,660 | 10/1974 | Hunter | 356/153 |
| 3,900,264 | 8/1975 | Heitmann et al. | 350/162 R |
| 4,265,534 | 5/1981 | Remijan | 356/354 |

FOREIGN PATENT DOCUMENTS

168914  5/1965  U.S.S.R. .............................. 356/138

OTHER PUBLICATIONS

Everett, P. N., "Technique for Aligning Laser Mirrors Using Gas Laser", Rev. of Sci. Instruments, 3–1966, p. 375.

Meyer-Arendt et al., "Angular Measurements by Means of a Ronchi Ruling", App. Optics, 1-1963, p. 77.

*Primary Examiner*—William H. Punter
*Attorney, Agent, or Firm*—Richard G. Geib; Mellor A. Gill

[57] ABSTRACT

A system and method of determining the angular displacement of one or more members is disclosed. A reference laser beam is diffracted, reflected and impacted upon a face of a display as a light pattern in which the pattern spacing is representative of a determinable angular displacement relative to a reference pattern.

12 Claims, 16 Drawing Figures

PITCH-YAW-ROLL
"NULL"

PITCH+YAW
ANGULAR DISPLACE-
MENT ROLL "NULL"

PITCH+YAW+ROLL
ANGULAR
DISPLACEMENT

PITCH-YAW
ANGULAR
DISPLACEMENT

ROLL ANGULAR
DISPLACEMENT

TRIAXIS LASER ALIGNMENT SYSTEM AND METHOD

RELATED APPLICATION

This is a continuation of application Ser. No. 970,651, filed Dec. 18, 1978, now abandoned.

BACKGROUND OF THE INVENTION

The present invention relates to measurement and location systems and, more particulary, to a triaxis laser system useful for providing measurable angular information with respect to a ground plane.

Laser systems designed for a multitude of purposes have been generally commercially available since the 1960's. Basic refinements in these systems have included bulk reductions and the advent of the low power laser (with an output of the order of several milliwatts). With the compacting of laser technology, the number of practical laser applications have been compounded.

As compared to other conventional alignment techniques, the advantages of laser systems include increased sensitivity, faster recording of measurements and remote meter readout. These and other advantages have combined to provide impetus to an increasing trend toward the commercial use of lasers. In the field of manufacturing alignment techniques, laser devices are firmly embedded for applications such as aligning avionic systems on sophisticated aircraft. In this environment, the increased accuracy, decreased time required for alignment and the decrease in the necessary operator skill level all provide further incentives for employment of laser technology.

Previous laser alignment systems have recognized that the coherent laser beam could be directed towards an angularly adjustable reflective surface from which it would be reflected to a fixed target. Typically, the incident beam passes through an aperture at the center of the target, and by manipulation of the reflective surface, the returning beam can be relocated as to strike the target at approximately the target center. This indicates that the reflective surface is now oriented perfectly, or nearly perfectly, perpendicular to the plane of the laser.

Various modifications of this technique have since been proposed, all of which share the common aim of producing an optical alignment system which senses an angular displacement. Most have means of reorienting some component as to produce a null, representing the desired alignment. While systems of this general type have been satisfactory for various alignment applications, they fail to provide apparatus which is capable of actually measuring the angular displacement of the moving body. The ability to make such measurements and to define planes at a discrete angle from a given reference is essential for various manufacturing techniques as well as for surveying and other grading applications.

One reference pertaining to a type of optical measuring system is disclosed in U.S. Pat. No. 3,269,254, issued to L. Cooper, et al. This device includes a graded mirror to define the roll, pitch and yaw orientation of a body to which the mirror is attached. The patentees use an autocollimation system to project the graded light pattern upon an image measuring reticle. A linear scale can be imposed upon the reticle for measuring angular displacement of the body. This scale is determinable based upon the distance of the collimating lens from the reticle and the focal length of the lens.

A fundamental problem with this type of configuration is that the collimator lens must be located close enough to the moveable body to receive enough light rays to produce a discernable pattern at the reticle. The light source and reticle must also be displaced from the lens a distance no greater than its own focal length.

These and other inherent limitations restrict the Cooper system to a range of operation of about one to two feet (between the moveable body and imaging target) and to use with other than laser light sources. These are impractical limitations for the type of applications for which the present invention was intended. Nowhere has it been proposed that a purely optical system may be employed to actually measure the degree of relative angular displacement between surfaces, in three axis, irrespective of the distance between the reference source and target.

It is, therefore, a major purpose of this invention to provide a laser measurement system which not only senses misalignment between a plurality of surfaces, but also allows for the accurate angular measurement of such displacement in three axis completely independent of a ground reference.

It is a general purpose of the present invention to provide a family of optical alignment techniques which eliminate any requirement for an ocular lens system, imaging focusing lenses or image measuring reticles in initial system alignment or subsequent measurement of the relative angular displacement between the various surfaces.

SUMMARY OF THE INVENTION

These and other objects are accomplished in the present invention by providing a system including one or more ruled surfaces (single ruled or quadruled) to diffract a coherent light beam into increments which are directed to appear on a target at known angular intervals independent of any linear scale and regardless of the target distance. The target, or other moveable elements within the system, can be manipulated in order to reorient the beam pattern for more convenient measurement. In such a case, the movement of the element may be measured.

Various reflective and transmission schemes may be employed within the system in order to accommodate multiple measurements in a plurality of planes.

DESCRIPTION OF THE DRAWINGS

Several exemplary embodiments of the invention will be further described with reference to the accompanying drawings in which.

DETAILED DESCRIPTION

Figure 1:
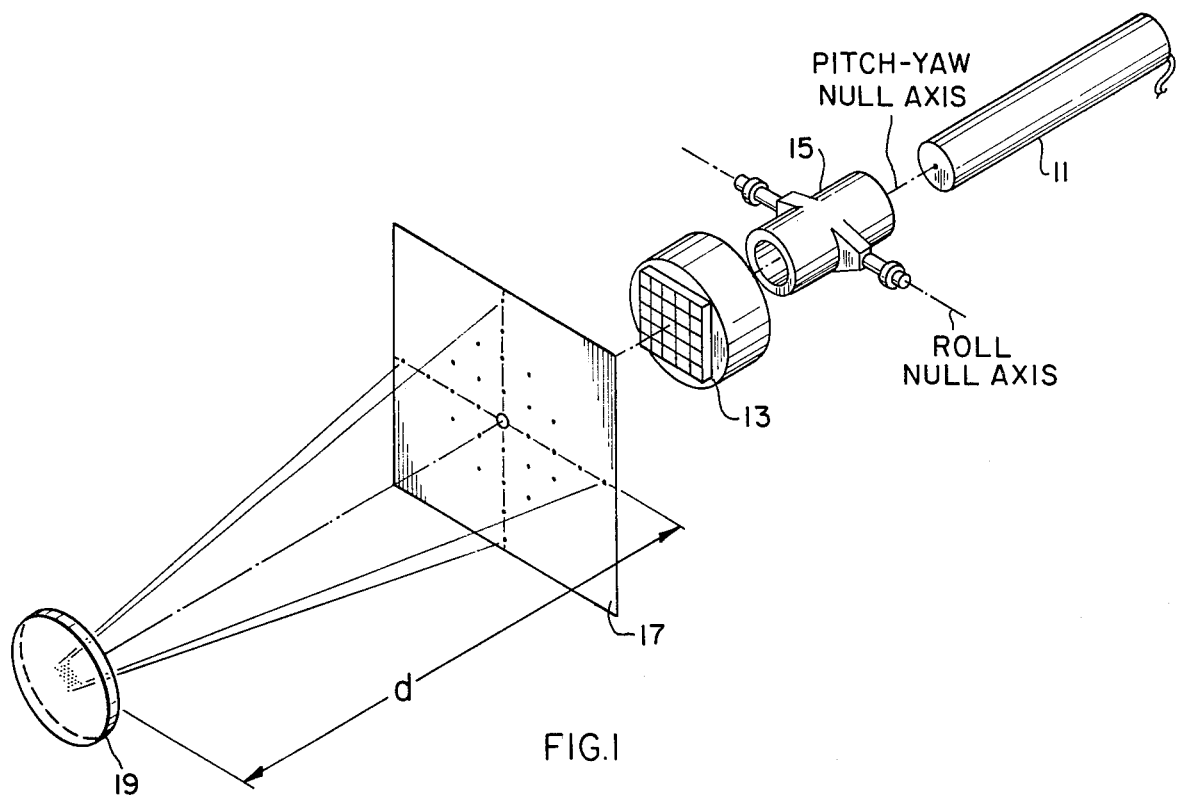
FIG. 1 is an illustration of one embodiment of the present invention showing a means of measuring the angular displacement, in two axes, of a surface at any unknown distance from the reference source.

FIG. 1 illustrates a basic system for measuring the angular displacement of a reflective surface using diffracted coherent light.

The diffraction means is known to those skilled in the art, as a ronchi ruling, consisting of alternating parallel, equal width, clear and opaque lines, usually machined into a piece of glass.

To increase the number of visible diffracted orders, a simple system is used whereby a large scale crossed, or single ruling is computer drawn onto mylar or white paper. This is then photographically reproduced to the desired scale on a glass photographic plate. Experimentation has shown that a clear line width double that of the opaque line width produces the optimum number of refracted orders.

Again, per FIG. 1, laser 11 provides a beam of coherent light from a reference plane which passes through the above-mentioned ruling 13, held by adapter 15. The diffracted light pattern traverses a small opening in the center of target 17 connected to laser 11 and impacts on reflective surface 19.

Figure 1A:
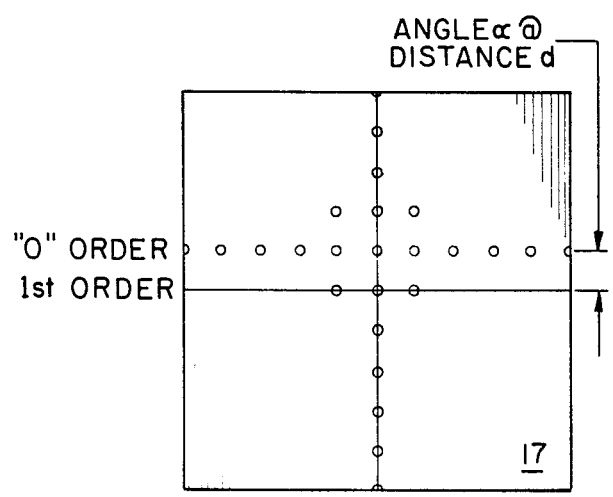
FIGS. 1a and 1b illustrate typical target patterns for the system shown in FIG. 1.
Figure 1B:
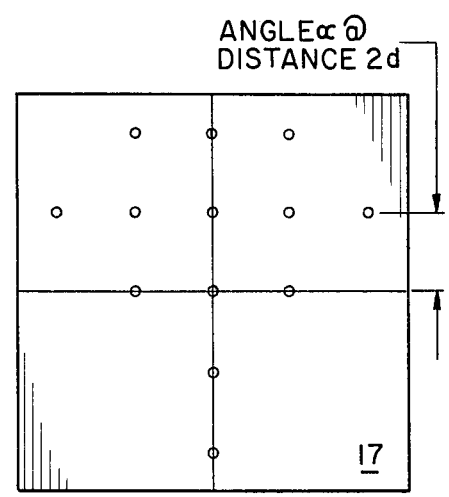

Referring now to FIGS. 1a and 1b, the reflected diffraction pattern strikes target 17, appearing as a pattern containing a plurality of spaced points of light, generally in the shape of a cross. The linear spacing between each point may be changed by varying the distance, d, of the reflective surface relative to the target. Despite any change in the linear spacing, however, the space between each light point remains representative of a single determinable angular quantity defined as angle $\alpha$ in FIGS. 1a and 1b which angle is dependent only upon the frequency of the diffraction ruling used. The incremental angle of the diffracted beam can thereby be designed to the scale required for each specific alignment problem. By comparing the target pattern with a known reference line, the angular displacement may then be directly measured from the target.

If the reflective surface is in a plane perfectly parallel to that of the target, the reflected pattern will, of course, strike the target along the reference level. As the angular orientation of the reflective surface changes, so does the location of the pattern on the target surface. With this observable pattern movement, the angular displacement error in pitch or yaw between the plane of the mirror and the reference beam may be directly measured regardless of the distance between the reflective surface and the target (reference FIG. 1).

Ordinarily with single beam auto-reflection, it would be necessary to measure the distance between the reflective surface and the light source in order to compute the alignment error. Using the system and technique of the present invention, a scale is provided which remains constant regardless of distance. As previously explained, this scale can be varied to meet the requirements of any particular application.

Figure 2:
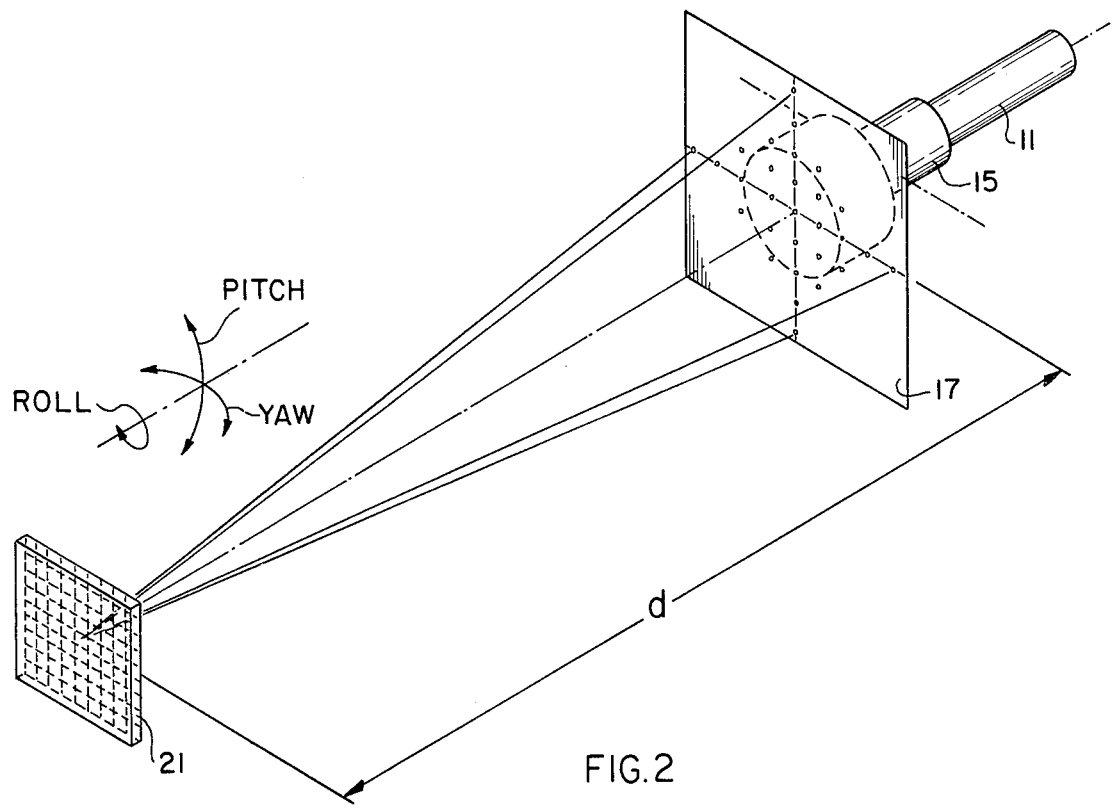
FIG. 2 is an illustration of another embodiment of the present invention showing a means of measuring the angular displacement, in three axes, of a surface at any unknown distance from the reference source.

FIG. 2 is another configuration of the present invention wherein an unbroken, straight laser beam is impinged upon a crossed mirrored ronchi ruling 21.

This mirror ruling consists of alternating parallel constant frequency reflective and opaque lines oriented both horizontally and vertically forming a quadrule pattern. The reflected diffraction pattern forms an image having predetermined angular intervals between each reflected order affected only by the frequency of the ruling.

If the reflective surface is in a plane perfectly parallel to that of the target, the reflected diffraction pattern will strike the target along the reference level. As the angular orientation of the reflective surface 21 changes, so does the location of the pattern on the target surface.

Figure 2A:
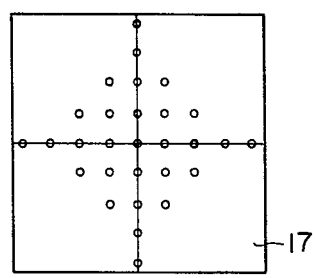
FIGS. 2a, 2b, and 2c illustrate typical target patterns for the system as shown in FIG. 2.
Figure 2B:
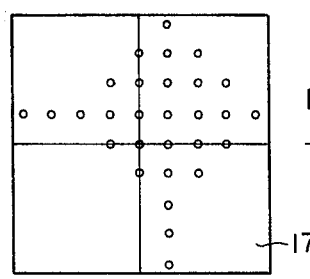

This angular displacement in pitch and/or yaw can be directly visually determined as shown in FIGS. 2a and 2b as the frequency of the diffraction pattern is known.

Figure 2C:
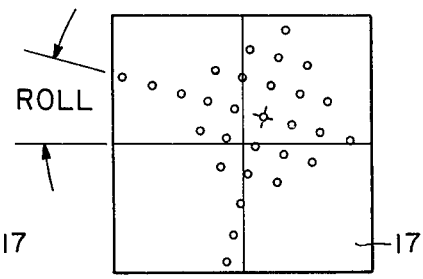

In this configuration, there is now a third axis "roll" as in FIG. 2c. Rotating the reflective ruling 21 around the axis of the laser beam, rotates the reflected diffraction pattern on the face of target 17 at exactly the same rate. The reflective ruling may, therefore, be set at roll null by visually aligning the horizontal and/or vertical light spots to the targets' reference lines.

Figure 3:
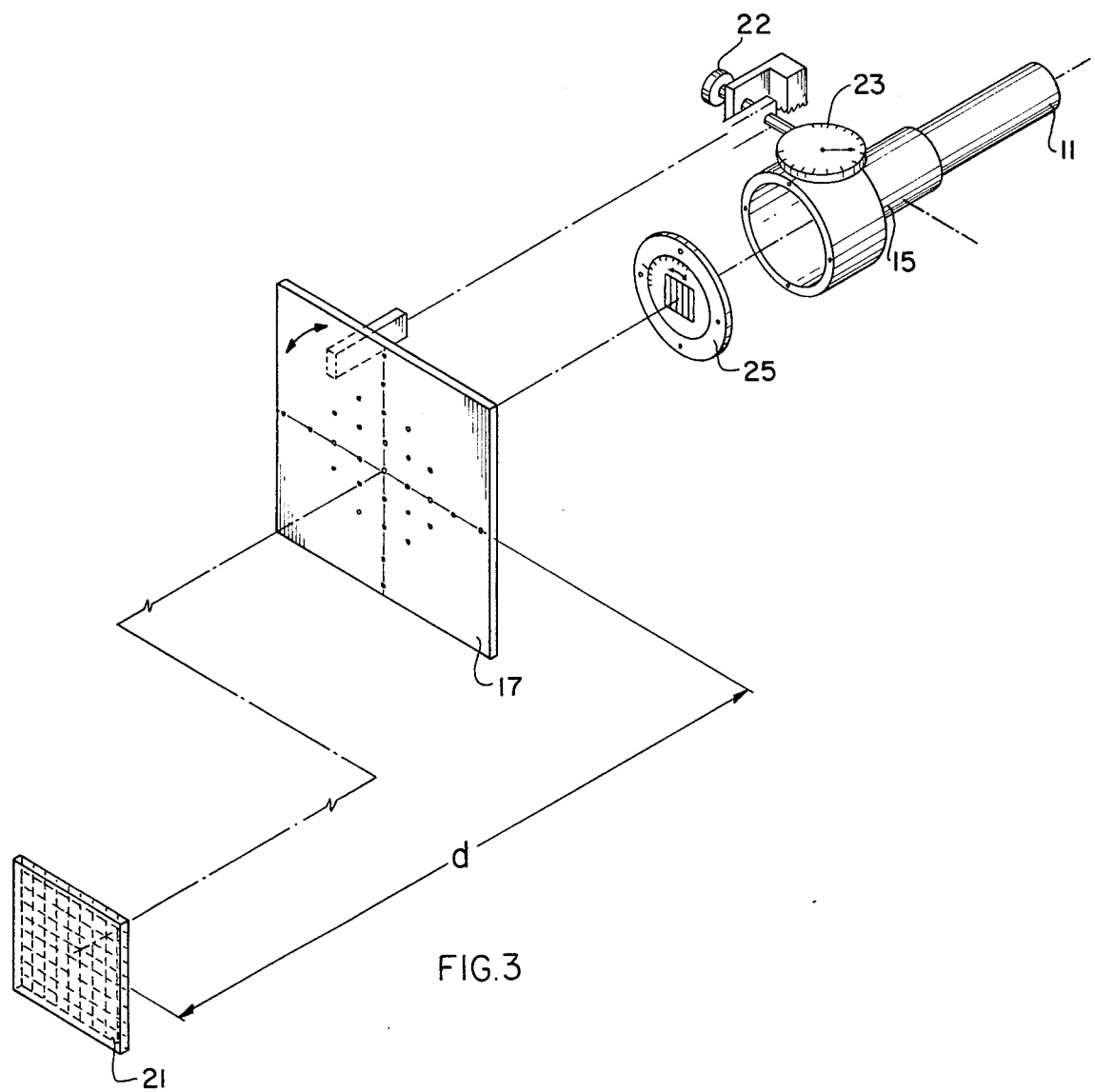
FIG. 3 is an illustration of another embodiment of the present invention showing a means of aligning and/or measuring the degree of relative angular displacement between a plurality of surfaces, in three axes, at any unknown distance from the reference source.

FIG. 3 is yet another configuration of the present invention wherein, in addition to the ability to directly determine angular displacement in pitch and yaw by visually estimating to approximately one-third the frequency of the selected ruling; and to directly determine roll null by aligning the reflected spots on the target reference level; a precise method and apparatus for measuring angular displacement in all three axes has been added.

First, it will be noted by those skilled in the art that the human eye is a very efficient centering device. Anywhere within visual range, the human eye has the capability of repeatedly centering a spot of light energy upon a target line. With an optimum target line width of one-third the light spot diameter, this repeatability is consistently within a very few thousandths of an inch. This natural phenomenon is used in the present invention to eliminate the need for an ocular lens system and image measuring reticles.

A single ruled transmission ruling whose frequency is the same as, or a known multiple of, the reflective surface frequency, is mounted in a suitable scaled rotating mechanism 25 in front of the laser 11. Different mechanisms may be interposed, each of which may provide a beam pattern of a different frequency.

A laser beam transmitted through this ruling is reflected from a quadruled, or single ruled reflective surface 21 of suitable frequency and the diffraction pattern impinges upon the surface of target 17.

Figure 3A:
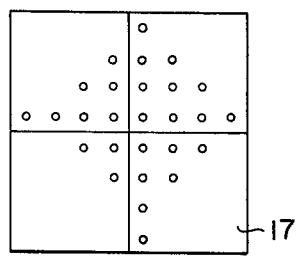
FIGS. 3a and 3b illustrate typical target patterns for the system as shown in FIG. 3.

As the angular orientation of the reflective surface 21 changes, so does the location of the pattern on the target surface as shown in FIG. 3a. When an angular offset in pitch and/or yaw is observed that is other than one frequency, or multiple of same, the single ruling is rotated until the first order spot is centered precisely on the target reference line. The graduations having been previously calibrated to the frequency of the reflective ruling and this the graduation line in coincidence with the zero reference line can be read directly for angular displacement in seconds of arc, if the displacement is less than one frequency. If the displacement is greater than one frequency, the graduation reading is added to the total number of frequencies that are on the same side of the target reference line as the zero order reflection.

Figure 3B:
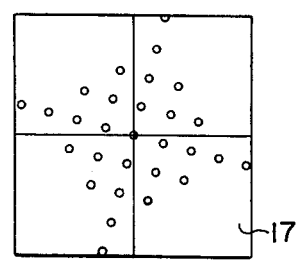

The roll measurement (see FIG. 3b) is a completely mechanical system wherein the target 17 and collar (not shown) are rolled by turning thumb screw 22 about the laser reference beam at its center until the horizontal and vertical diffraction patterns are precisely aligned upon, or parallel to, the target reference lines. The roll angular displacement is then read directly in seconds of arc from a properly calibrated dial indicator, such as indicator 23.

It should be noted that laser 11 may be of the helium neon variety produced by various manufacturers or another device used to produce a coherent light beam along an optically straight path. Any collimated light generated by an incandescent lamp, arc lamp, light emitting diode, or similar source, producing sufficient intensity for viewing under normal lighting conditions is acceptable for the present invention.

Figure 4D:
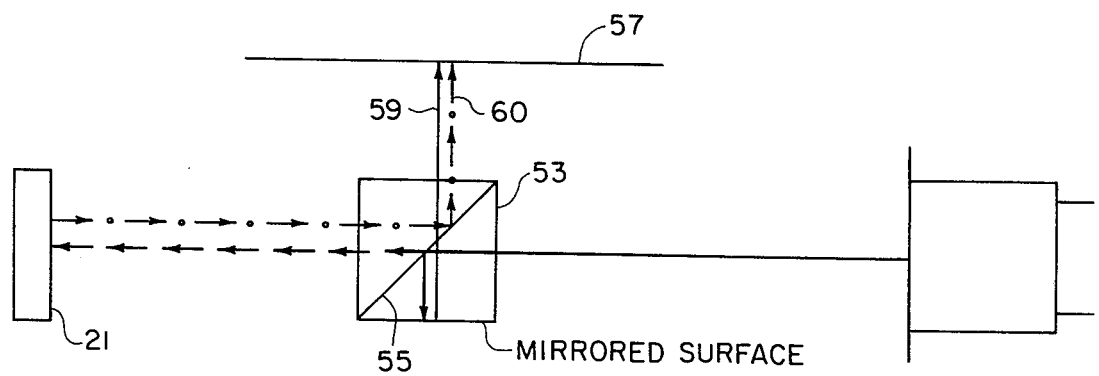
FIG. 4d illustrates the passage of transmitted and reflected beams through a cube beam splitter so as to be reflected and diverted to a display in superimposed relationship.
Figure 4A:
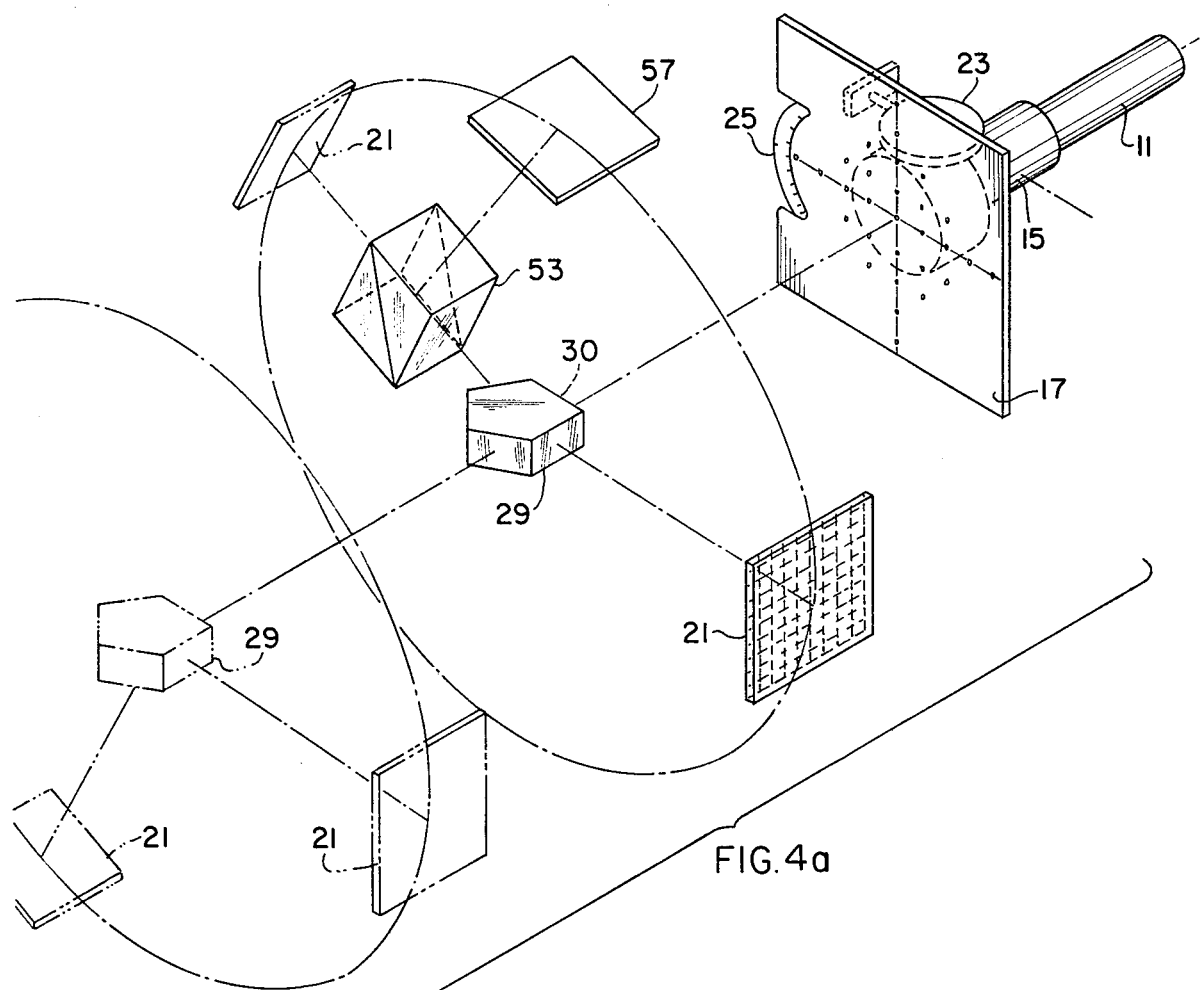
FIGS. 4a and 4b illustrate yet further embodiments of the present invention including the use of a conventional pentaprism and a cube beam splitter to align and/or measure the relative angular displacement between a plurality of surfaces at any unknown distance from the reference source.

FIG. 4a illustrates the use of the present invention in combination with one or more pentaprisms.

As known to those skilled in the art, a pentaprism is used to deflect the incident light beam precisely 90°, independent of small positional changes of the prism relative to the beam. This 90° angle may be held to within one arc second or less.

A pentaprism may be mounted within a tube wherein it may be rotated about the cylindrical axis of the tube. Such a device, commonly referred to as an optical square, may be used to describe a plane perpendicular to the incident beam.

As applied to the present invention, pentaprisms may be used to allow for the measurement of the angular displacement between a plurality of surfaces oriented in perpendicular planes. FIG. 4 illustrates one such scenario wherein the use of pentaprism 29 allows for the alignment of a multiple of reflective surfaces 21 with respect to target face 17.

The pentaprism may be located at any desired distance from the target face 17 along the axis of the incident laser beam. Mounted in a suitable housing (not shown), it may then be rotated to any desired position within a full 360° arc, sweeping a plane precisely normal to the incident laser beam.

A quadruled or single ruled reflective surface 21 in a suitable mount (not shown) may be positioned at any desired location within this circular sweep. The separation between the reflective surface 21 and the pentaprism 29 may be any known or unknown distance within the aperture limitations of the pentaprism.

In this configuration, the present invention functions as described in connection with previous embodiments wherein any angular displacement in one, two or three axes of the reflective surface is directly observed on the target face 17. The reflective surface may either be nulled to the target reference lines or the angular displacement read directly from the graduated scale in pitch and yaw and from the dial indicator in roll. FIG. 4c illustrates a ruled partially reflective surface 30 of prism 29; i.e., the surface parallel to target 17. This ruling 30 may be used to define a beam pattern on the target for nulling of the pentaprism orthogonally as herein after explained relative to cube 31 of FIG. 5; and, the ruling 30 may be used upon the reflective surface as with the ruling 13 aforementioned.

Figure 4B:
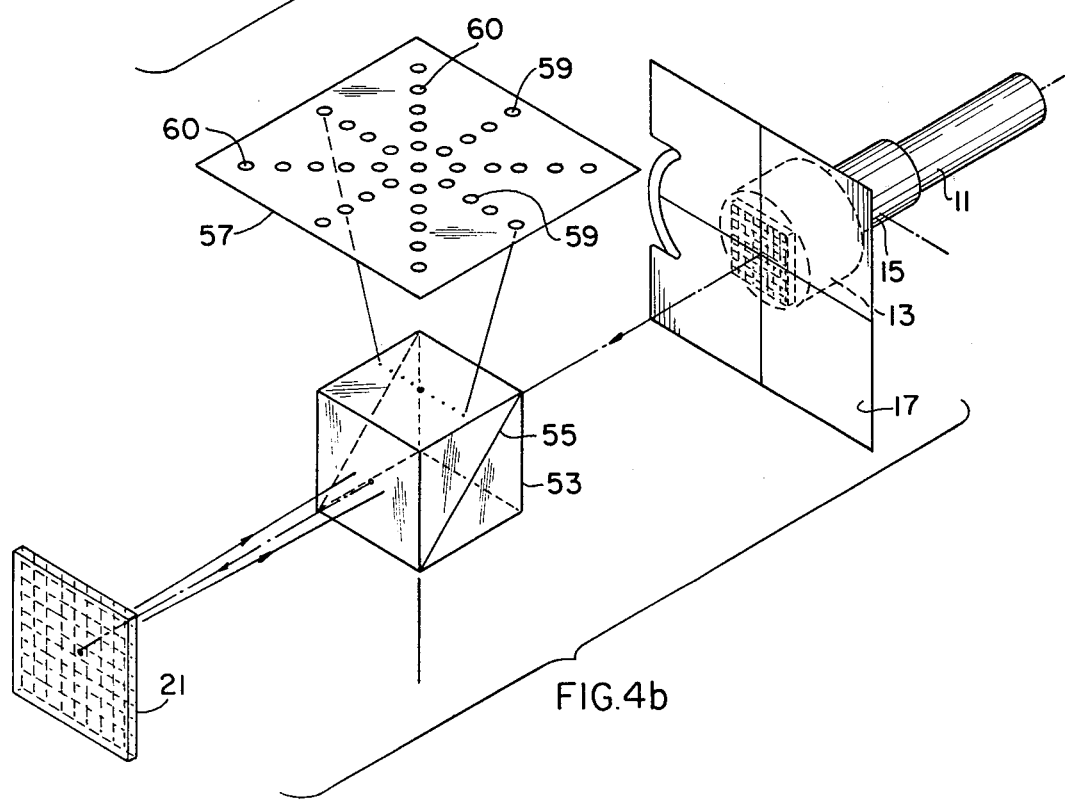
Figure 4C:
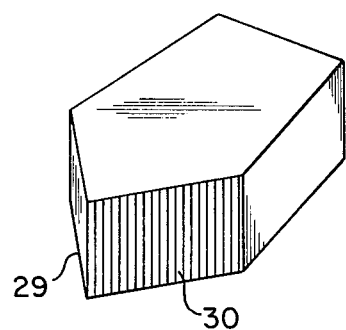
FIG. 4c illustrates a view of a light deflecting prism having a ruled surface.

FIG. 4b illustrates the use of the present invention in conjunction with a cube beam splitter. This arrangement offers the advantage of allowing observation of the incident and/or reflected light pattern on an auxiliary screen which may be positioned at a convenient viewing location.

As known to one skilled in the art, a cube beam splitter is composed of a pair of right angle prisms, one of which includes a partially reflective coating on its hypotenuse. The prisms are cemented together to form a cube. As a result of this construction, a portion of one or more incident beams is deflected off the hypotenuse and may be viewable on a translucent surface of the cube or, alternatively, on a remote auxiliary screen.

As shown in FIG. 4b, cube beam splitter 53 is positioned as to intersect the laser light pattern between source 11 and reflective surface 21. Incident light from source 11 is partially transmitted through the cube as to impact on surface 21. Another portion of the incident light is reflected downward from partially reflective layer 55 to the lower surface of the cube.

If the lower surface of the beam splitting cube is reflective, the incident light striking it is caused to be reflected as to appear as a reference plane pattern 59 as shown on auxiliary screen 57.

If so desired, the upper, transmissive surface of the cube may be made translucent as to eliminate the need for an auxiliary screen and display beam patterns directly on the translucent surface.

Light reflected from surface 21 is also displayed on either screen 57 or the translucent surface as a reflected pattern 60. In this manner, the relative displacement of the reflective surface from a reference plane can be measured at a display location remote from target 17.

In some situations, it may be desirable to rule a portion of the surface of cube 53. It may also be more convenient to make either the upper or lower surfaces either partially or fully reflective as the application requires. Such modifications would be obvious to one skilled in the art and may be performed within the body and scope of the present invention.

It is also anticipated that it may, in some cases, be desirable to attach a cube beam splitter as in FIG. 4b, to a pentaprism, as in FIG. 4a. This configuration would suggest itself where it is desired to display, on a surface other than target 17, the angular displacement between a plurality of surfaces oriented in perpendicular planes. In another configuration illustrated in the left portion of FIG. 4a, cube beam splitter 53 is interposed between prism 29 and, at least one ruled reflective surface 21, if not all, to provide for the projecting of incident and reflected beams to a display 57 remote of target 17. Other variations on this arrangement will become apparent to one skilled in the art from an understanding of this disclosure in solving a problem for a particular application.

Figure 5:
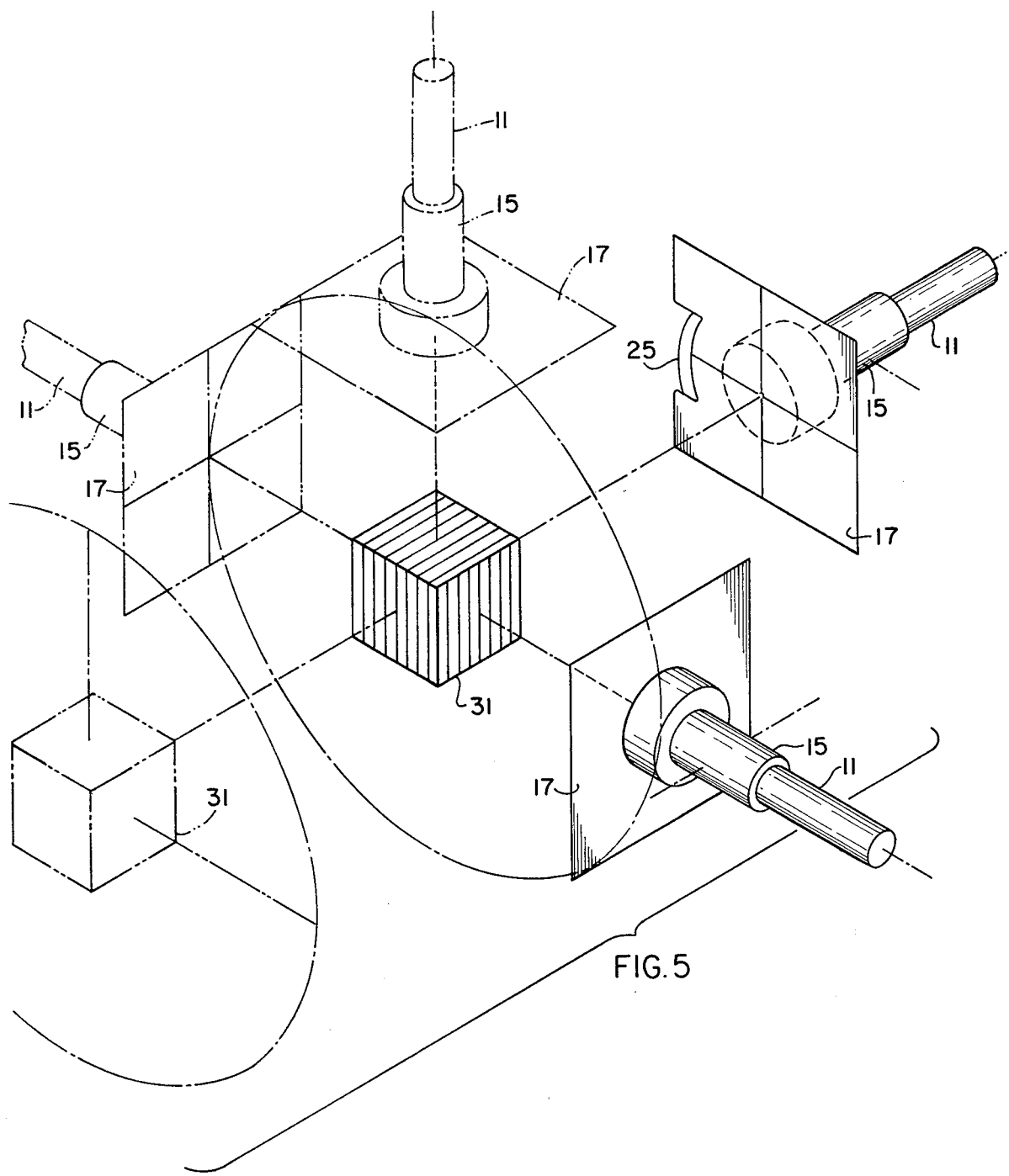
FIG. 5 illustrates still another embodiment of the present invention wherein a mirrored, ruled cube with parallel and perpendicular faces is used to align and/or measure the degree of relative angular displacement between a plurality of surfaces at any unknown distance from the reference source.

FIG. 5 illustrates yet another application of the present invention in combination with one or more quad-ruled or single ruled mirrored optical cubes.

An optical cube as known to those skilled in the art is usually of glass or stellite with up to six reflective faces flat to one-quarter wave or less and parallel and/or perpendicular to each other within three arc seconds or less.

The cube 31 may be located at any desired distance from the target face 17, and nulled out in all three axes as previously described by aligning the diffracted beam upon the target reference lines.

A duplicate system to the present invention may then be oriented normal to any other face of the cube in three axes at any known or unknown distance from the cube.

If precise normality of any individual system cannot be obtained, the angular displacement may be visually observed on its target face 17 and read directly from the graduated scale in pitch and yaw and from the dial indicator in roll.

Figure 6:
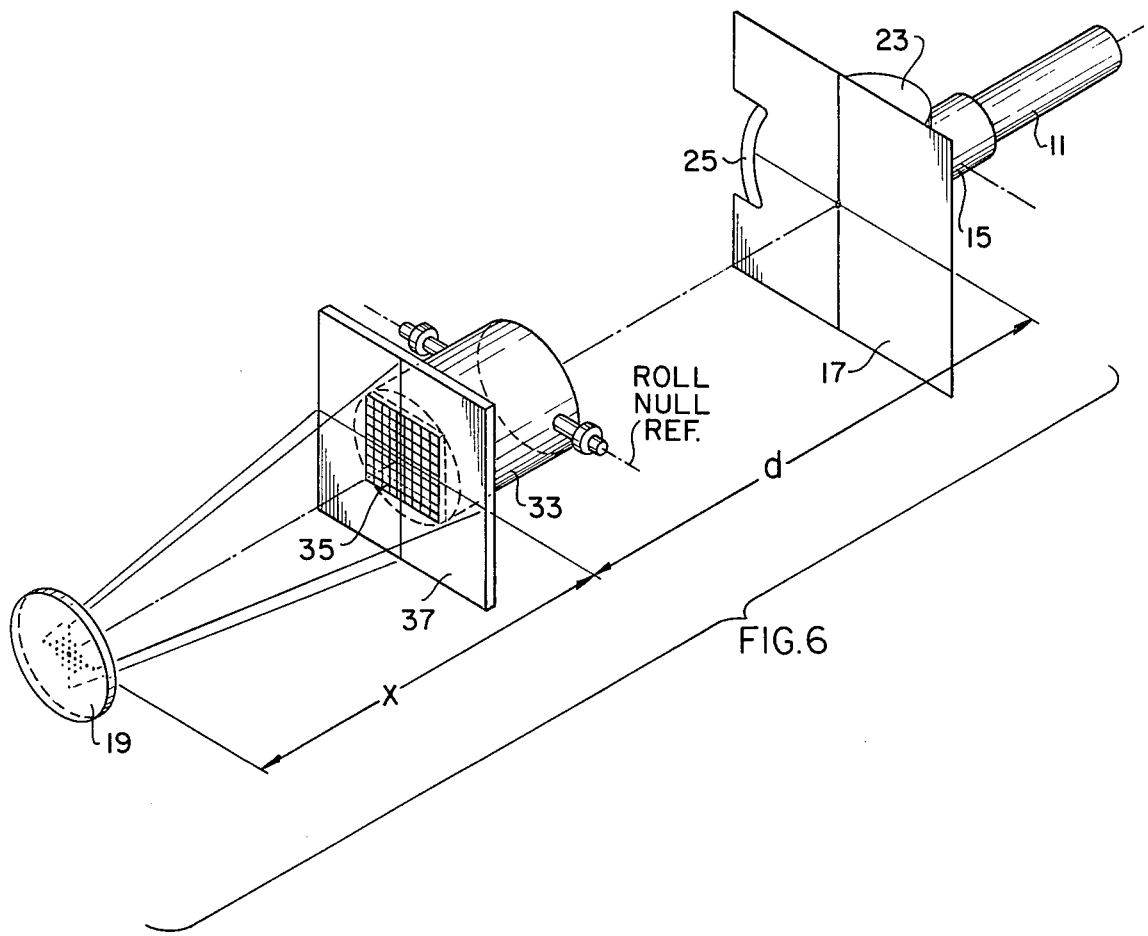
FIG. 6 illustrates an embodiment of the present invention which is adapted to align and/or measure the relative angular displacement in three axes, of a first surface relative to the reference source at any unknown distance from said source, and further, to align and/or measure the relative angular displacement in two axes, of a second surface relative to the first.

FIG. 6 depicts a further embodiment of the present invention which is adapted to measure the pitch, yaw and roll of a first surface relative to a reference laser beam, and the pitch and yaw of a second surface relative to the first.

Laser 11 provides a reference beam which passes through target 17 and impacts on partially mirrored surface 35 which is ruled at a known interval. Surface 35 partially reflects the reference beam back to target 17 and partially transmits the beam some distance, x, toward reflective surface 19.

The reflected diffraction pattern appearing upon target 17 enables an observer to null or measure the relative pitch and yaw of surface 35 with respect to the reference beam. If the ruled surface is housed in a rotating mount 33, an observer could also measure the roll of surface 35.

The transmitted portion of the reference beam, which is also a diffraction pattern, impacts upon reflective surface 19 which reflects the beam to appear as a pattern upon target 37 attached to mount 33. The pitch and yaw of surface 19, with respect to surface 35, may consequently be directly measured off target 37. As noted in connection with other examples, surface 19 could alternatively be ruled and made rotatable in order to facilitate relative roll measurement.

Safety is a prime consideration in these embodiments; i.e., direct viewing of the laser is prevented by the concept of autoreflection hereby disclosed.

Having described several types of designs, it should be apparent that the particular type of reflective and transmissive configuration employed in the present system and technique is a function of the particular application. Moreover, these and other operative variations which may be apparent to one skilled in the art may be made without departing from the spirit and scope of the present invention, which is meant to be limited only by the appended claims which follow.

What is claimed is:

1. A method of determining the angular displacement of one or more members relative to a reference plane, said method comprising the steps of:
    generating reference lines on a target representative of the reference plane
    diffracting a beam of coherent light from the reference plane through the target by projecting same through a transmission ruling having a known frequency and through a small opening in the target;
    attaching a reflective surface to the one or more members to be receptive of the diffracted beam from the small opening through the target whereby said diffracted beam impacts the reflective surface on the member whose orientation is to be determined;
    reflecting said diffracted beam by said reflective surface on the face of the target; and
    determining from the image of the reflected diffracted beam on the face of the target the displacement of the member from the reference plane by measuring the displacement of said diffraction pattern from target reference lines.

2. The method as recited in claim 1 further including the step of measuring the roll component of said displacement by rotating said ruling means a measurable degree about a reference axis defined by said coherent beam until said reference lines achieve a desired orientation with respect to said beam pattern.

3. The method as recited in claim 2 wherein said ruling means are rotated until a reference coordinate system defined by the locus of points about the zero order of said beam pattern coincides with, or is parallel to, a coordinate system defined by said reference lines.

4. The method as recited in claim 2 wherein the step of measuring the degree of rotation includes scaling the surfaces of stationary and non-stationary parts of said rotatable ruling means, said scaling being determined by the relationship between the mechanical rotation of said grating means and the optical rotation of said diffracted pattern.

5. A method of determining the relative angular displacement of a member relative to a reference plane, said method comprising the steps:
    impacting a beam of coherent light on the first surface of a light deflecting prism;
    transmitting said beam through said light deflecting prism;
    impacting said transmitted beam on a ruled reflective surface attached to a remote member;
    reflecting said beam off said reflective surface;
    positioning a beam splitting cube between said light deflecting prism and said reflective surface so as to intersect said transmitted and reflected beams to partially reflect said transmitted and reflected beams as they pass through said beam splitting cube for displaying said partially transmitted beam with said partially reflected beam superimposed on a display surface; and
    determining the angular displacement of said member from the reference plane defined by the transmitted beam pattern on said display surface using an angular scale represented by the spacing between elements of the reflected beam relative to the transmitted beam pattern.

6. The method as recited in claim 5 further including the step of ruling said first surface of said light deflecting prism at some known frequency.

7. A method of determining the relative displacement of a remote member from a reference plane, said method comprising the steps:
    impacting a beam of coherent light on a first ruled surface of a light deflecting prism;

partially reflecting said beam from said prism first surface to form a first beam pattern on a target indicative of the reference plane;

partially transmitting said beam through said light deflecting prism;

impacting said partially transmitted beam on a second ruled reflective surface attached to a remote member;

reflecting said partially transmitted beam off said second surface through said light deflecting prism to form a second beam pattern on said target; and nulling said remote member until said second pattern becomes oriented with the first beam pattern whereby the displacement of the remote member from the reference plane may be determined.

8. A method of determining relative displacement of a member in regard to a reference plane comprising:

impacting a beam of coherent light on a first, ruled surface of a light deflecting prism;

partially reflecting said beam of coherent light off said first surface to form a first beam pattern on a target having reference lines;

nulling orthogonally the first beam pattern with respect to the reference lines;

partially transmitting said beam of coherent light through said light deflecting prism;

impacting said transmitted beam of coherent light on a ruled reflective surface attached to the remote member;

reflecting said beam as diffracted by said ruled reflective surface through said light deflecting prism to form a second beam pattern on the target; and rotating said target until said second beam pattern and the reference lines are aligned even if spaced from one another and determining the relative displacement between said target and said remote member.

9. Apparatus for measuring the displacement of a member relative to a reference plane comprising:

a source coherent light;

a means to locate the source on the reference plane for projecting a beam of coherent light from the reference plane in a desired direction;

ruling means connected to said means to locate the source, said ruling means having a known frequency intersecting said beam to produce a diffracted beam pattern having a plurality of spaced points of light spaced at known increments;

target means connected to said source beyond said ruling means, said target means having a small opening to pass said diffracted beam pattern therethrough and reference marks on a face thereof opposite said source illustrative of the reference plane; and a reflective surface connected to the member to intersect and reflect said diffracted beam back toward said target.

10. The apparatus as recited in claim 9 wherein said ruling means include means for imposing different rulings into the path of said coherent beam, each of said rulings having a different frequency such that the reflected beam display on said target may be expanded or contracted as desired in order to improve the accuracy of the angular displacement measurement.

11. The apparatus as recited in claim 9 wherein the connection of the target means to the source includes rotational reorientation means such that said target means can be displaced rotationally to reorient said target means with respect to the diffracted beam reflected onto said target means.

12. The apparatus as recited by claim 9 and further including a prism interposed in the path of said diffracted beam between said target means and said reflective surface.

* * * * *

UNITED STATES PATENT AND TRADEMARK OFFICE
CERTIFICATE OF CORRECTION

PATENT NO. : 4,330,212
DATED : May 18, 1982
INVENTOR(S) : John M. Miller

It is certified that error appears in the above-identified patent and that said Letters Patent are hereby corrected as shown below:

Column 3; between lines 4 and 5, insert - - -

Figure 3C:
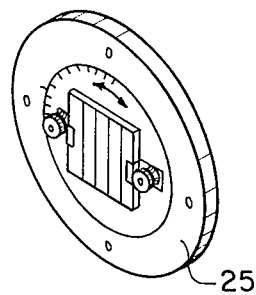

Fig. 3c is a perspective view of the rotating mechanism of Fig. 3 showing the attachment of the ruled glass plate such that different rulings may be interposed. - - -

Signed and Sealed this

Tenth Day of August 1982

[SEAL]

Attest:

GERALD J. MOSSINGHOFF

Attesting Officer

Commissioner of Patents and Trademarks